US009488145B2

(12) United States Patent
Butler et al.

(10) Patent No.: US 9,488,145 B2
(45) Date of Patent: Nov. 8, 2016

(54) VEHICULAR LIQUID CONTAINMENT SYSTEM AND METHOD FOR VERIFYING INTEGRITY OF SAME

(71) Applicant: Inergy Automotive Systems Research (Societe Anonyme), Brussels (BE)

(72) Inventors: Josh Butler, Bloomfield Hills, MI (US); David Hill, Commerce Township, MI (US); Bjorn Criel, Sint-Martens-Lennik (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 0 days.

(21) Appl. No.: 14/654,205

(22) PCT Filed: Dec. 13, 2013

(86) PCT No.: PCT/EP2013/076484
§ 371 (c)(1),
(2) Date: Jun. 19, 2015

(87) PCT Pub. No.: WO2014/095601
PCT Pub. Date: Jun. 26, 2014

(65) Prior Publication Data
US 2015/0345455 A1    Dec. 3, 2015

Related U.S. Application Data

(60) Provisional application No. 61/745,282, filed on Dec. 21, 2012.

(30) Foreign Application Priority Data

Jul. 3, 2013    (EP) ..................................... 13174960

(51) Int. Cl.
*F02M 69/50*    (2006.01)
*F02M 65/00*    (2006.01)
(Continued)

(52) U.S. Cl.
CPC ............ *F02M 65/006* (2013.01); *B60K 15/03* (2013.01); *F01N 3/2066* (2013.01);
(Continued)

(58) Field of Classification Search
CPC ............... F01N 2610/1406; F01N 2610/1433; F01N 2610/1453; F01N 2610/1473; F01N 2610/148; F01N 2900/1808; F02D 19/0665; F02D 19/0678; F02D 19/0681; F02D 19/0684; F02D 2041/225; F02D 2041/228; F02D 2200/0602
USPC ........... 60/273, 277, 286, 295; 123/445, 446
See application file for complete search history.

(56) References Cited

U.S. PATENT DOCUMENTS 5,467,641 A    11/1995    Williams et al.
5,651,350 A    7/1997    Blomquist et al.
(Continued)

FOREIGN PATENT DOCUMENTS

EP    0 611 674    8/1994
WO    96 27738    9/1996

OTHER PUBLICATIONS

European Search Report Issued Sep. 18, 2013 in European Patent Application 13174960.8 Filed Jul. 3, 2013.
(Continued)

*Primary Examiner* — Thomas Denion
*Assistant Examiner* — Jorge Leon, Jr.
(74) *Attorney, Agent, or Firm* — Oblon, McClelland, Maier & Neustadt, L.L.P.

(57) ABSTRACT

A vehicular liquid containment system including a tank, a pump arranged to pump a liquid from the tank to a vehicular system via a feed line, a pressure sensor arranged to detect a pressure in a vapor dome inside the tank, and a sprayer arranged within a branch of the feed line, the outlet of the sprayer being arranged inside the tank.

10 Claims, 10 Drawing Sheets (51) Int. Cl.
*F01N 3/20* (2006.01)
*F02M 37/00* (2006.01)
*B60K 15/03* (2006.01)
*F02D 41/22* (2006.01)
*F02D 19/06* (2006.01)

(52) U.S. Cl.
CPC ..... *F02M 37/0076* (2013.01); *F02D 19/0665* (2013.01); *F02D 19/0678* (2013.01); *F02D 19/0681* (2013.01); *F02D 19/0684* (2013.01); *F02D 2041/225* (2013.01); *F02D 2041/228* (2013.01); *F02D 2200/0602* (2013.01)

(56) References Cited

U.S. PATENT DOCUMENTS

| | | | | |
|---|---|---|---|---|
| 5,709,080 | A * | 1/1998 | Arora | F01N 3/2066 60/274 |
| 5,809,976 | A | 9/1998 | Cook et al. | |
| 2003/0188528 | A1 * | 10/2003 | Tost | B01D 53/90 60/286 |
| 2008/0314027 | A1 * | 12/2008 | Barber | B01D 53/90 60/286 |
| 2010/0077740 | A1 * | 4/2010 | Basista | F01N 3/2066 60/310 |
| 2010/0172816 | A1 * | 7/2010 | Mayer | F01N 3/2066 423/352 |
| 2010/0288240 | A1 * | 11/2010 | Johnston | F02D 19/0668 123/515 |
| 2011/0099996 | A1 * | 5/2011 | Driscoll | F01N 3/208 60/598 |
| 2012/0143480 | A1 * | 6/2012 | Pursifull | F02D 19/0615 701/105 |
| 2013/0139792 | A1 | 6/2013 | Perry et al. | |

OTHER PUBLICATIONS

International Search Report Issued Feb. 26, 2014 in PCT/EP2013/076484 Filed Dec. 13, 2013.

* cited by examiner

VEHICULAR LIQUID CONTAINMENT SYSTEM AND METHOD FOR VERIFYING INTEGRITY OF SAME

The present invention pertains to the field of vehicular liquid containment systems, in particular fuel tanks and liquid additive tanks, as used inter alia in automobiles.

As the environmental requirements with respect to emission of fuel and other chemicals by vehicles are increasingly stringent, it is of the utmost important that tanks carrying chemicals aboard vehicles be kept leak-free. It is therefore practically required to equip such tanks with means to detect and preferably report any leaks that may occur.

Hereinafter, the prior art and the invention will primarily be described with reference to fuel tanks. This is done without loss of generality, as the skilled person will understand that the statements made also apply to other vehicular liquid tanks.

It is known to detect leaks in tanks by increasing or decreasing the pressure inside the tank in a controlled way, and subsequently observing the pressure in the tank. An inflow or outflow of gas causes the modified pressure to return to its rest state. The expected rate of decay in the absence of leaks is physically determined by the nature of the various lines and valves that are in fluid communication with the tank. This expected rate of decay can be determined in advance, to calibrate the method. If the pressure decays at a rate that exceeds the rate observed in calibrated non-leak conditions, or if the tank fails to even reach the target test pressure (increased or decreased pressure relative to the normal pressure), the presence of a leak is determined.

Known methods use a dedicated pump, known as a "leak detection pump" or LDP, to produce the controlled pressure change. The installation of such a dedicated pump is complex and costly. Other known methods use the vehicle's internal combustion engine as a source of underpressure (a "vacuum source"). It is a disadvantage of those methods that they cannot be used in situations where there is no internal combustion engine available, or where the internal combustion engine may remain inactive for long periods of time, as is the case in electrical and hybrid vehicles, respectively.

Furthermore, the present systems on traditional internal combustion vehicles rely on environmental conditions to create pressure evolutions, in order to detect a leak. As a result, these systems are inherently less reliable than a system that induces pressure via other means.

It is therefore an object of embodiments of the present invention to provide a vehicular liquid containment system that does not present these disadvantages.

According to an aspect of the present invention, there is provided a vehicular liquid containment system comprising a tank, a pump arranged to pump a liquid from said tank to a vehicular system via a feed line, a pressure sensor arranged to detect a pressure in a vapor dome inside said tank, and a sprayer arranged within a branch of said feed line, the outlet of said sprayer being arranged inside said tank.

Preferably, the outlet of the sprayer is arranged in the vapor dome, i.e. above the fluid level in the tank. It is understood, as a matter of basic physics, that whenever any amount of liquid is stored in the tank, vapor of said liquid will be present in the air pocket inside the tank. Hereinafter, we will refer to this pocket containing a mixture of air and vapor as the "vapor dome".

The system according to the invention has a sprayer, fed by the liquid pump, which exhausts the atomized liquid within the vapor dome.

In the system described above, it is advantageous for a liquid pump to be used since it already exists in the application, and no new components need to be added. It is possible however to use other devices or means to spray a fluid into a vapor dome, of a closed system. In any application, the effect of spraying a fluid mass into a vapor dome with gaseous mass, of a closed system, could be found advantageous for a variety of reasons.

In a closed system, containing a mass of fluid, and a gaseous mass in a vapor dome, the fluid mass can be used to create two fallout effects. The two effects could then be advantageous for any application with a closed system. Taking a warm fraction of said fluid mass, and spraying it into a colder gaseous mass of vapor dome, will increase the pressure and temperature in said vapor dome. Taking a cold fraction of fluid mass and spraying it into a warmer gaseous mass in a vapor dome would decrease temperature and pressure in said vapor dome.

The system according to the invention can be used to detect leaks in the tank, by monitoring the pressure evolution in the tank following a fuel flow through the sprayer. The pressure in the vapor dome should increase in a distinct manner, as a result of the atomized liquid being added to the air-vapor mix. This distinct pattern of pressure increase can be determined in advance in calibrated non-leak conditions. If a deviation is detected between the observed pattern and the calibrated pattern (taking into account a certain error margin), it may be concluded that a leak is present.

As a means of decreasing the error margin, one or more inputs can be used including but not limited to the following: fuel level in the system, temperature internal to the system, temperature external to the system, barometric pressure, and test duration in time.

In an embodiment of the vehicular liquid containment system according to the present invention, a valve is operatively arranged between the pump and the sprayer (i.e., within said branch), to avoid efficiency losses during normal vehicle operation, due to excess fuel flow not used to drive the vehicle.

In an embodiment of the vehicular liquid containment system according to the present invention, the valve is a normally-closed valve, adapted to be opened by the occurrence of a predetermined minimum pressure at the inlet side.

This embodiment has the advantage of avoiding the need to separately control the valve. It is sufficient to control the pump to generate a sufficiently high liquid pressure, whereupon the valve (of the "bypass valve" type) will open automatically, producing the desired flow to the sprayer to create the desired pressure increase.

In another embodiment of the vehicular liquid containment system according to the present invention, the valve is a normally-closed valve, adapted to be opened by external actuation.

It is an advantage of this embodiment that the timing of the opening of the valve can be accurately controlled, for instance by an ECU. This allows the sprayer to run at a substantially lower pressure than that of normal vehicle operation, ultimately reducing power consumption.

In an embodiment of the vehicular liquid containment system according to the present invention, the liquid is fuel, and the vehicular system is a fuel injection system of an internal combustion engine.

In another embodiment, the liquid is urea, and the vehicular system is an additive injection system of a selective catalytic reduction system.

Selective catalytic reduction (SCR) systems are a class of pollution control systems that use a reducing agent to reduce NOx compounds present in the exhaust gas of internal combustion engines into harmless molecular nitrogen and oxygen and water. The reducing agent is preferably ammonia, which is generated in situ from a precursor stored on-board the vehicle. The precursor is preferably urea, which is commercially available for vehicular use in the form of a eutectic aqueous solution by the trade name AdBlue. The present invention is particularly suited for use with urea tanks.

In an embodiment of the vehicular liquid containment system according to the present invention, the valve and the pressure sensor are operatively controlled by an electronic control unit, directly or indirectly.

An electronic control unit (ECU) is a programmable component (e.g., a processor) that can be used to control a variety of processes onboard the vehicle.

In this context, "direct" control refers to electronic control of the valve, and "indirect" control refers to the approach of controlling the pump to deliver sufficient pressure to open a bypass valve.

The ECU is preferably configured to drive the pump and or open the valve at selected points in time, and to monitor the time evolution of the sensed pressure subsequent to said opening. The pressure in the vapor dome should increase in a distinct manner, as a result of the atomized liquid being added to the air-vapor mix. This distinct pattern of pressure increase can be determined in advance in calibrated non-leak conditions. The ECU preferably stores the calibrated pattern, and is configured to determine whether a deviation between the sensed pattern and the calibrated pattern exceeds a certain maximum margin. If the margin is exceeded, the ECU preferably generates a suitable leak detection alarm signal.

In a particular embodiment, the ECU is configured to relay a leak detection signal to an On-Board Diagnostics system.

An On-Board Diagnostics (OBD) system is a dedicated vehicular system that inter alia keeps track of malfunctions, in particular malfunctions in systems with a potential environmental impact. Thus, the OBD system may play an important role in verifying whether a vehicle meets applicable emission standards. As leakage of liquids carried on board the vehicle can have important environmental impact, it is advantageous to import leak detection information in the OBD system.

In an embodiment of the vehicular liquid containment system according to the present invention, the sprayer is arranged above a maximum fill level of the tank.

The maximum fill level of the tank is determined by conventional means, such that the tank, in normal usage, is never completely filled with liquid. In this embodiment, the outlet of the sprayer is always in the vapor dome.

According to an aspect of the present invention, there is provided a vehicular liquid containment system comprising a tank, a pressure sensor and/or a pressure switch, and a means of spraying fuel into the vapor space of the fuel.

According to an aspect of the present invention, there is provided a vehicular liquid containment system comprising a tank, a pump arranged to pump a liquid from said tank to a vehicular system via a feed line, a pressure sensor arranged to detect a pressure in a vapor dome inside said tank, a valve arranged between a branch of said feed line and an at least one sprayer, the outlet of which is arranged inside the fuel tank.

According to an aspect of the present invention, there is provided a vehicle comprising the vehicular liquid containment system described above.

This aspect may concern any vehicle which needs to carry a liquid on board for its own operation. In particular, the invention may be applied to motor vehicles such as motorcycles, automobiles, buses, and trucks; trains; ships; and aircraft.

According to an aspect of the present invention, there is provided a method for verifying the integrity of a vehicular liquid containment system as described above, the method comprising operating the pump to activate the sprayer, monitoring pressure sensed by said pressure sensor subsequent to said activation of said sprayer, and determining whether said monitored pressure deviates from a predetermined pressure evolution based on one or more measurements.

Preferably, the one or more measurements comprise at least a pressure measurement carried out with the aforementioned pressure sensor.

According to an aspect of the present invention, there is provided a method for verifying the integrity of a vehicular liquid containment system as described above, the method comprising operating the pump, opening the valve during the operating of the pump, monitoring pressure sensed by said pressure sensor subsequent to said opening of said valve, and determining whether said monitored pressure deviates from a predetermined pressure evolution based on one or more measurements.

In an embodiment, a method according to the present invention further comprises heating the liquid prior to said opening of said valve.

An advantage of this embodiment is the avoidance of negative pressure evolutions due to differential temperature between the fuel and vapor dome.

According to an aspect of the present invention, there is provided a computer program comprising code means configured to cause a processor to carry out a method as described above.

The technical effects and advantages of embodiments of the method and the computer program according to the present invention, correspond mutatis mutandis to those of the corresponding embodiments of the system according to the present invention.

These and other technical effects and advantages of the invention will now be described in more detail with reference to the attached figures, in which.

The present invention is inter alia based on the insight of the inventors that the existing liquid pump of the vehicular liquid containment system may be used as a source of excess pressure inside the vapor dome of the tank, by atomizing pressurized liquid provided by the pump. The present invention is further based on the insight of the inventors that the pressure jump obtained in this manner is surprisingly reproducible.

An embodiment of the system according to the present invention will now be described with reference to a tank, preferably a fuel tank, with a pump arranged to pump a liquid from the tank to the relevant system via a feed line, a pressure sensor arranged to detect a pressure in a vapor dome inside the tank, a valve arranged between a branch of the feed line and an sprayer, the outlet of which is arranged above the maximum fill level of the tank.

In this embodiment, the valve consists of a spring and a plunger, contained in a cylinder. In a rest position, the spring is compressed and arranged to force the plunger closed, such that no flow is allowed through the cylinder. Valves of this construction are sometimes designated "bypass valves".

Once a pressure equal to or greater than the force exerted by the spring is applied, the plunger opens and allows the pressurized liquid, e.g. fuel, to flow through the cylinder. The arrangement is such that the pump of the system provides the pressurized liquid to the valve, preferably via a branch of the feed line. The main feed line runs to a vehicular system, e.g. the fuel injectors of the internal combustion engine, which need not be operative to operate the valve. In the case of fuel injectors, these injectors may be shut off while the valve of the system according to the invention is being used.

Figure 1:
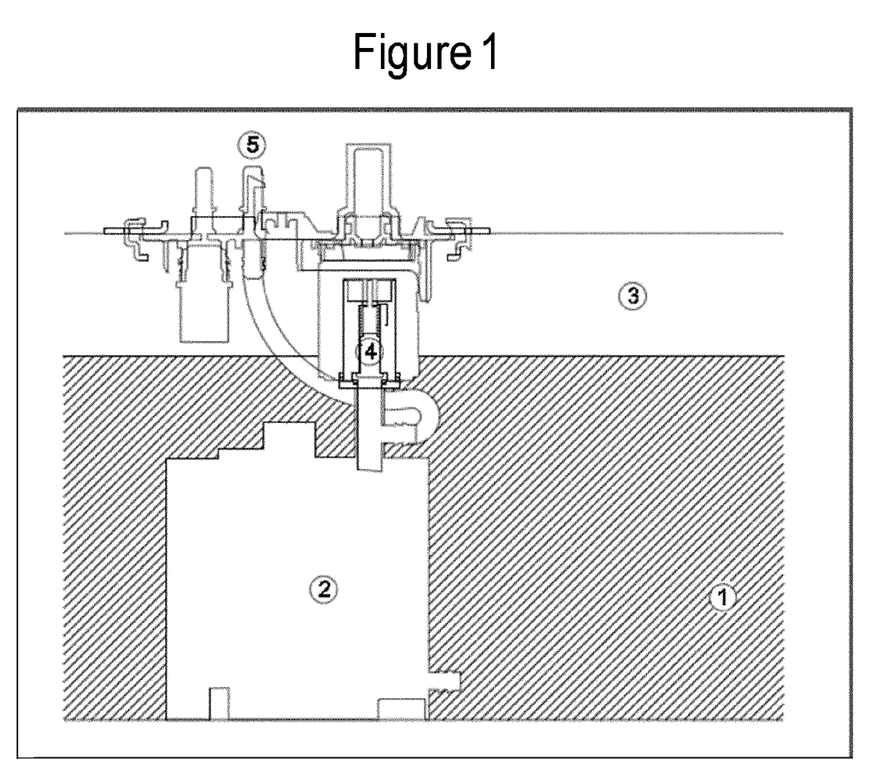
FIG. 1 illustrates a valve for use in embodiments of the system according to the present invention, in a closed position.
Figure 2:
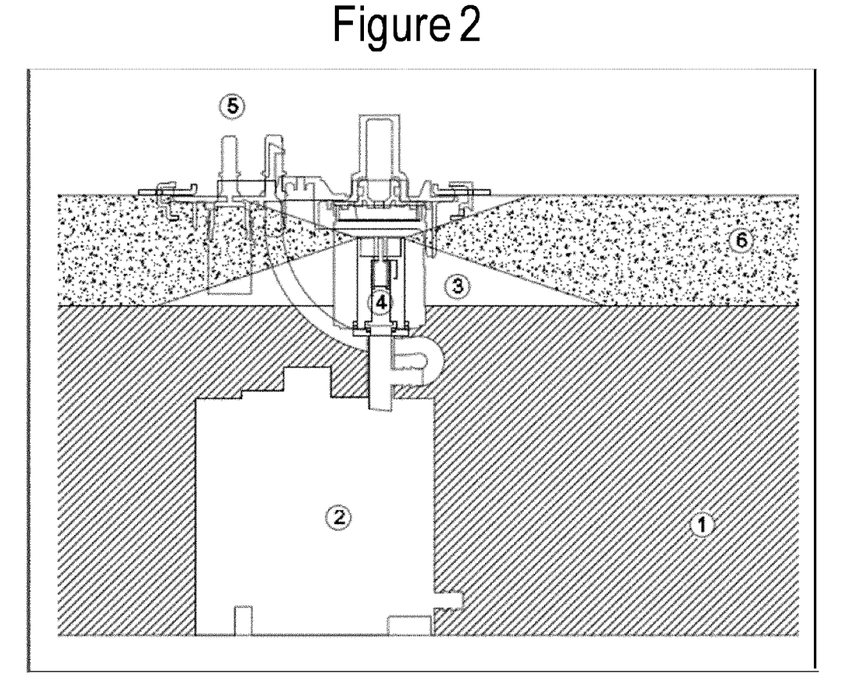
FIG. 2 illustrates the process of opening the valve of FIG. 1 to spray atomized liquid.
Figure 3:
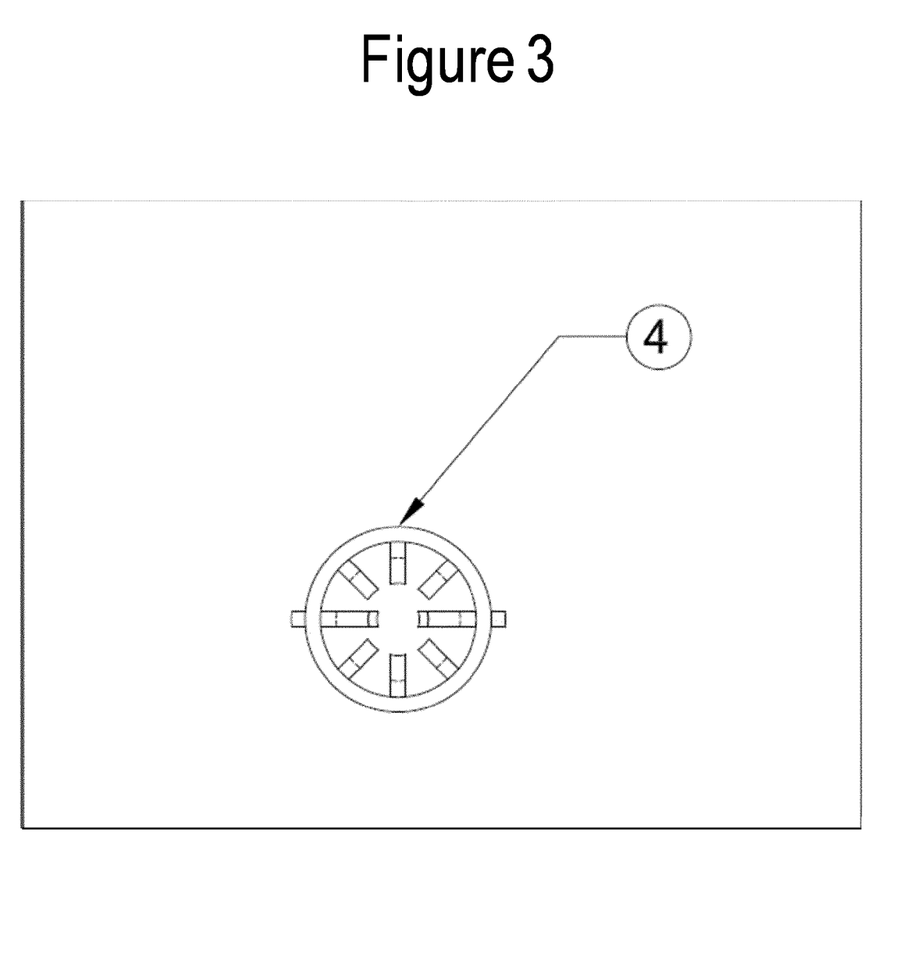
FIG. 3 provides a top view of the cylinder forming the valve of FIG. 1.
Figure 4:
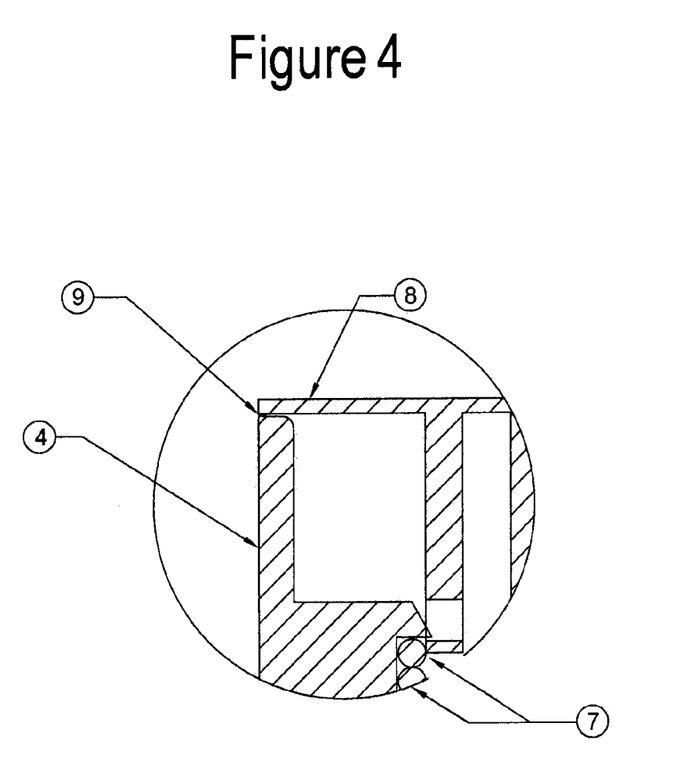
FIG. 4 illustrates a detail of the valve of FIG. 1.
Figure 5:
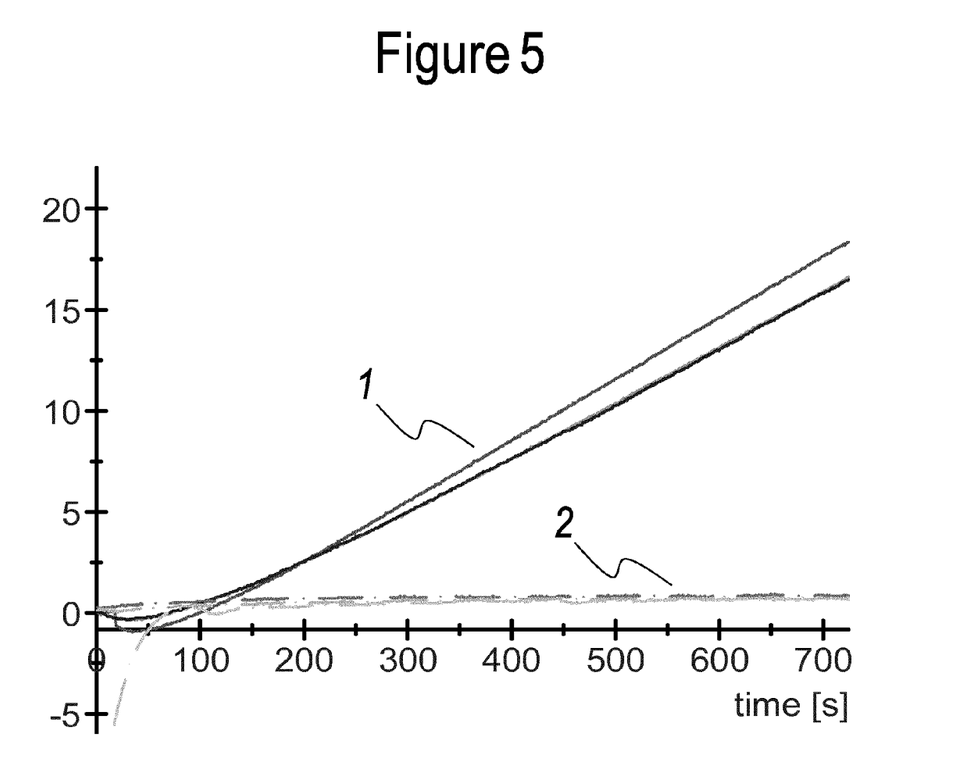
FIG. 5 represents a temperature and pressure measurement.
Figure 6:
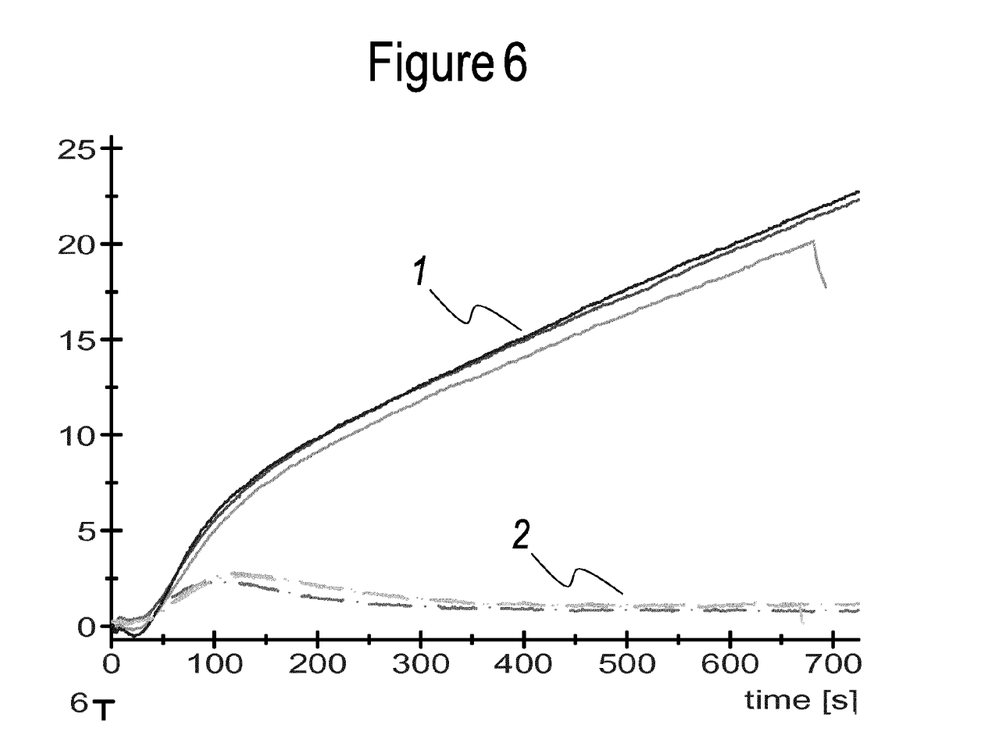
FIG. 6 represents temperature and pressure measurement results obtained when using the sprayer in an embodiment of the system according to the present invention.
Figure 7:
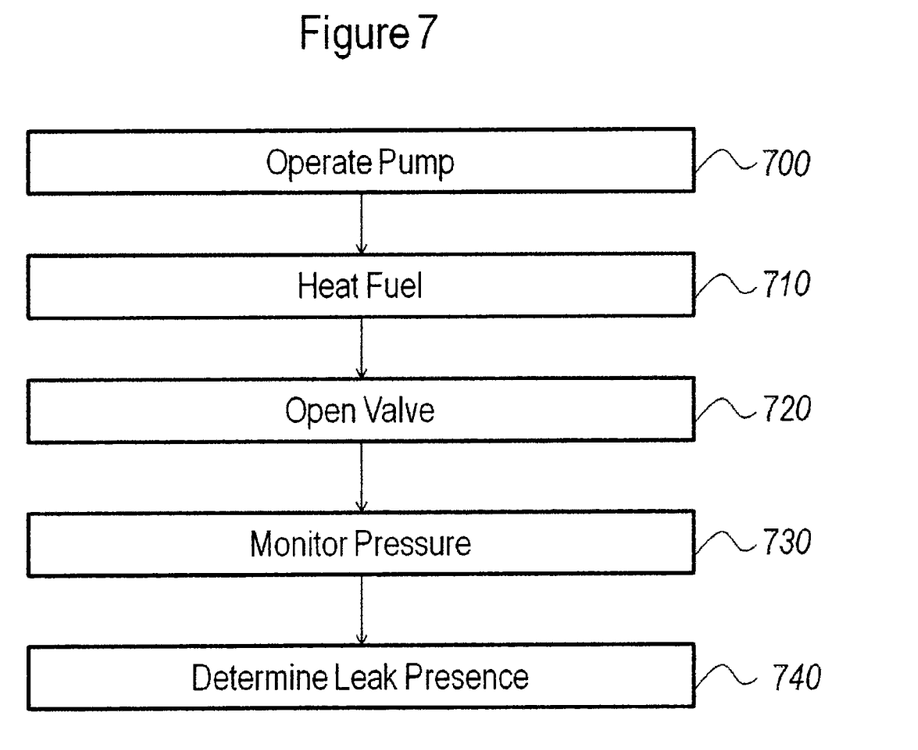
FIGS. 7-10 provide flow charts of a method according to embodiments of the present invention.

The outlet of the cylinder is a small opening, preferably in the ceiling (i.e., the wall opposite to the inlet) of the cylinder, which forms the sprayer of this embodiment. Once the liquid hits this ceiling, it is forced through the small opening, causing the liquid to atomize inside the tank, in particular within the vapor dome area of the tank. Once this happens, a jump in pressure is achieved. The occurrence of the pressure jump, the amplitude of which turns out to be very predictable, allows the pressure sensor to detect leak conditions by measuring the subsequent pressure change inside the tank.

The described embodiment may be modified by using other types of valves, such as a solenoid valve or a manual valve. Valves that are normally-closed are preferred.

When the invention is applied to fuel storage systems, the opening that serves as a sprayer preferably has a diameter in the range of 0-1 mm, more preferably 0.4-0.6 mm, and most preferably at or around 0.5 mm or 0.020 inch. It has been shown that with an atomizing opening in that range, sufficient pressure can be built up in the tank to allow meaningful leak detection measurements, while the pressure loss in the main feed line is sufficiently low to still allow normal operation of the internal combustion engine.

It is a further insight of the inventors that the efficiency of the sprayer, and hence the observed pressure jump associated with opening the valve, is temperature dependent. Preferably, the system provides a way to heat the liquid contained in the tank, to improve the atomizing of the liquid. This heating may be obtained by operating the pump in such a way that the total amount of pumped liquid exceeds the consumption by the relevant vehicular system, and feeding the excess back to the tank. For this purpose, the system preferably comprises a return line for returning unused liquid to the tank, which most preferably discharges the excess liquid in the zone nearest the inlet of the valve. This excess liquid will undergo a certain amount of heating as a result of its being forced through the pump, the feed line, and the return line.

Most preferably, the system also includes a temperature sensor for observing the temperature of the liquid and/or the vapor in the tank, such that the observed pressure evolution can be assessed relative to the expected pressure evolution (jump and decay) for the observed temperature. If done electronically, for example inside an ECU, expected pressure evolutions may be pre-stored in the processing platform (ECU) for a range of temperatures.

FIGS. 1-5 describe a fuel storage system according to an embodiment of the present invention, the valve of which will hereinafter be referred to as "LDBV" (leak detection bypass valve). FIG. 1 depicts a closed LDBV (4). The LDBV (4) must be arranged in fluid connection with the fuel pump (2), such that it allows flow of the fuel to the LDBV (4), as well as to the vehicle engine (5). The small opening at the top of the LDBV (4) must sit in the vapor dome (3) to allow for atomization of the fuel (6).

FIG. 1 also describes the operation of a fuel system that supplies fuel to a running vehicle engine, with a closed LDBV (4). The fuel pump (2) sucks fuel from the fuel supply (1). In this figure, the liquid pressure generated by the fuel pump (2) is less than the LDBV opening pressure, so fuel is pumped to the vehicle engine (5) only.

FIG. 2 describes the operation of opening the LDBV (4) to spray atomized fuel (6)—preferably heated—to build pressure in the vapor dome (3). In this figure, the vehicle engine (5) is preferably off, or at least in such a state that the vehicle engine injectors are closed. This allows the fuel pump (2) to run at a higher pressure. With the fuel pump (2) running at a higher fuel pressure, it heats the fuel supply (1) in the tank, which in turn builds some pressure in the vapor dome (3). The higher fuel pressure also pushes against the LDBV (4), such that the LDBV (4) eventually opens and allows fuel to flow through it. The (heated) fuel then reaches the top of the LDBV (4) and is forced through a small opening, by which the fuel (6) is atomized in the vapor dome (3). The heated and atomized fuel (6) builds pressure in the vapor dome (3).

FIG. 3 shows a top view of the LDBV cylinder (4). The top view shows the LDBV (4) cylinder ribs which hold the LDBV spring (7) and cap (8). The ribs also allow fuel to flow through the LDBV cylinder (4).

FIG. 4 shows a detailed view of the small opening between the LDBV cylinder (4) and the LDBV cap (8). Heating the fuel supply (1) with the fuel pump (2) causes pressure to increase in the vapor dome (3). Forcing the heated fuel through the small opening (9) then causes the fuel (6) to be atomized in the vapor dome (3), which causes a further pressure increase in the vapor dome (3), exhibiting a distinct pattern over time.

In FIG. 5, pressure is monitored over a time of 700 seconds within a tank system. The pressure rises as a result of the fuel pump being run, with the flow blocked, in order to heat the fuel within the tank. The upper lines (1) show the pressure increase in a sealed fuel system. The lower lines (2) show the pressure evolution in the same fuel system with a 0.5 mm leak. The result is a pressure differential of ~5 mbar in roughly 300 seconds. This pressure differential allows for the determination of whether the system has a leak or not.

In FIG. 6, pressure is monitored over a time of 700 seconds within a tank system. The pressure rises as a result of the fuel pump being run, with flow going to a sprayer as described above, in order to increase the pressure within the tank. The upper lines (1) show the pressure increase in a sealed fuel system. The lower lines (2) show the pressure evolution in the same fuel system with a 0.5 mm leak. The result is a pressure differential of ~5 mbar in roughly 100 seconds. This is clearly an improvement over the situation of FIG. 5, in that less energy is required to achieve the same resolution between leak and no leak conditions.

FIG. 7 provides a flow chart of a method for verifying the integrity of a vehicular liquid containment system according to an embodiment of the present invention. Without loss of generality, this embodiment is described with reference to a fuel containment system, having the general structure as described in the previous system embodiments. As an optional preliminary step, the method comprises powering the pump 700 heating the fuel in the tank 710. In order to perform the method according to the invention, it is necessary to operate the pump 700 in order to generate the necessary liquid pressure at the entry of the valve. The optional heating step 710 may coincide with the step of operating the pump 700, because the operation of the pump in a feedback mode (i.e., where the pumped fuel is substantially returned to the tank instead of being consumed by the engine), will cause the returned fuel to heat up. As a result of the increasing pressure and/or electronic or manual actuation of the valve, the valve is opened 720. This will cause a surge in the pressure within the vapor dome, as described above. The pressure evolution is monitored 730 during and subsequent to the opening of the valve. On the basis of this monitoring 730, the presence or absence of a leak can be determined 740. In particular, if subsequent to the opening of the valve, the pressure rises less sharply than would be expected in non-leak conditions, the presence of a leak may be determined 740. If the time-pressure pattern coincides within a predetermined margin with the expected pattern in non-leak conditions, the absence of a leak may be determined 740.

It will be immediately clear to the skilled person that the described method steps may be performed in an automated way, by means of a programmable component such as a microcontroller or a processor, which may constitute (a part of) the ECU of the vehicle. The programmable component interfaces with the pump, and is configured to activate it 700 when the method according to the invention is initiated. The programmable component may further be configured to shut down the engine and/or to verify whether the engine is in an inactive state, prior to proceeding with the present method. If the valve is electronically actuated, the programmable component interfaces with the valve and is configured to open it 720 at a given time. The programmable component interfaces with the pressure sensor and is configured to obtain an observed time-pressure pattern 730 upon and after the opening of the valve. Optionally, the pressure sensor information is also used to determine the time to open the valve 720, which may require reaching a minimum pressure level. Optionally, the programmable component further interfaces with a temperature sensor, to include temperature information in the assessment of leak presence, in particular by selecting the most appropriate expected time-pressure pattern for the observed temperature.

Figure 8:
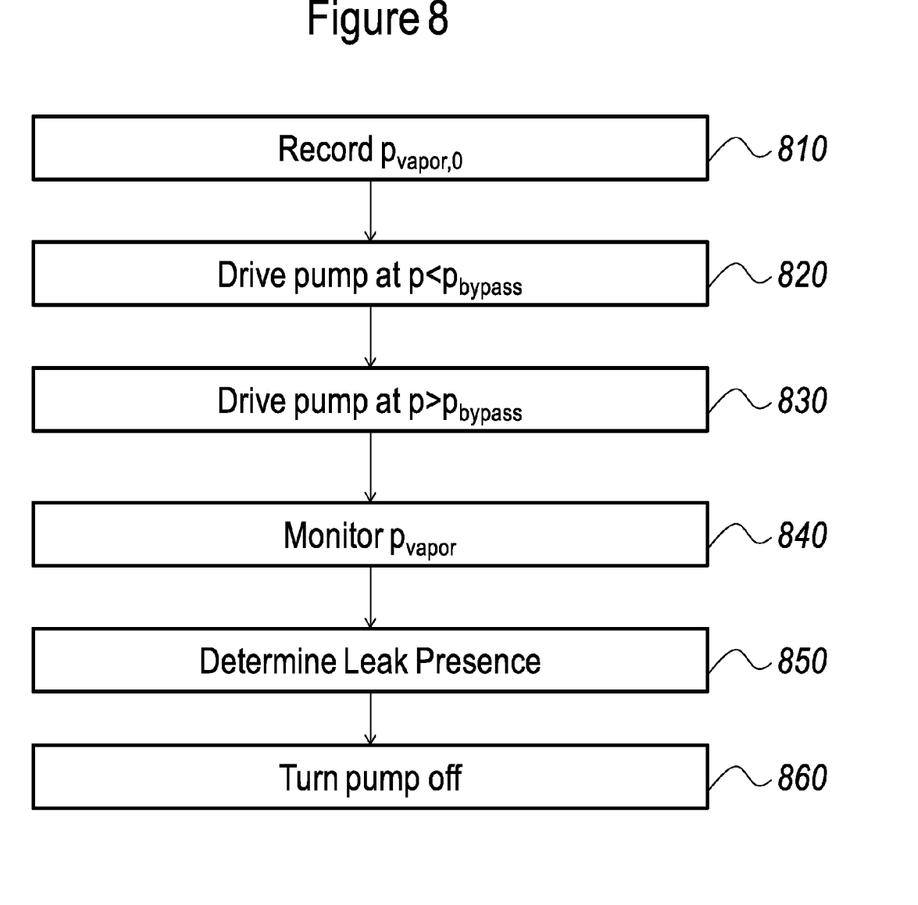

FIG. 8 depicts another embodiment of the method according to the present invention. In this embodiment, an initial pressure $P_{vapor,0}$ is taken 810, and the pump is powered to a level that restricts the sprayer from spraying, in order to pre-heat the fuel 820. Once the first specified time has elapsed, the pump power is increased to a level that allows the sprayer to spray for a specified time and or to a predetermined pressure level 830. At one or several points during the operation of the pump after the vehicle is shut off, the pressure in the tank is monitored 840 and compared to calibrated no-leak values to determine whether or not there is a leak in the system 850.

Figure 9:
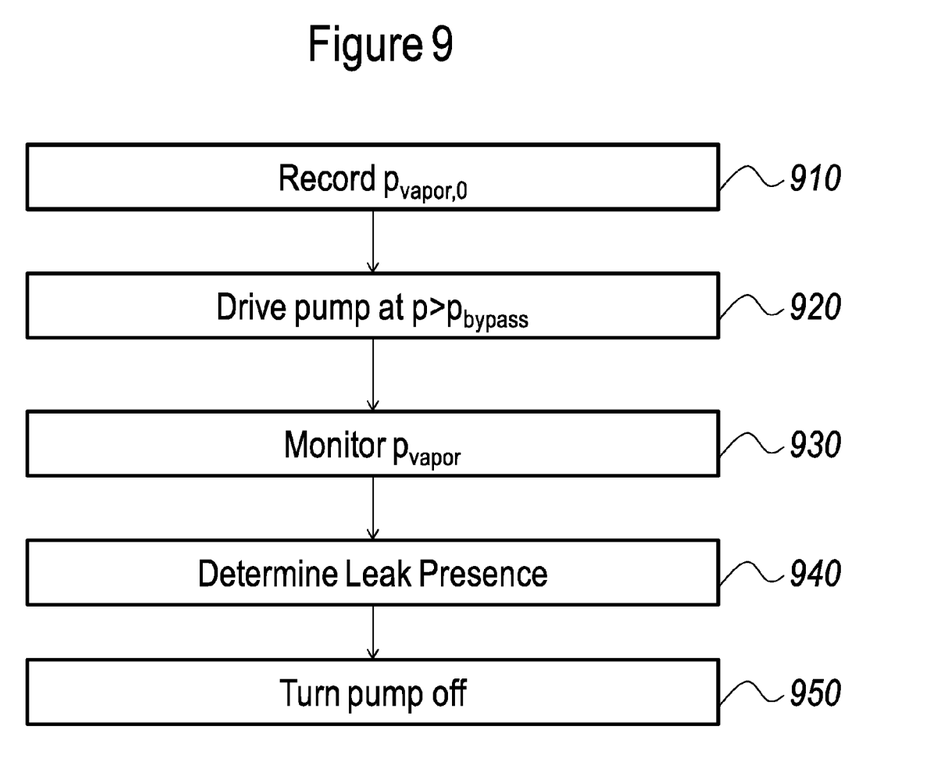

FIG. 9 depicts another embodiment of the method according to the present invention. In this embodiment, an initial pressure $P_{vapor,0}$ is taken 910, and the pump is powered to a level that allows the sprayer to spray for a specified time and/or to a predetermined pressure level 920. At one or several points during the operation of the pump the pressure in the tank is monitored 930 and compared to calibrated no-leak values to determine whether or not there is a leak in the system 940.

Figure 10:
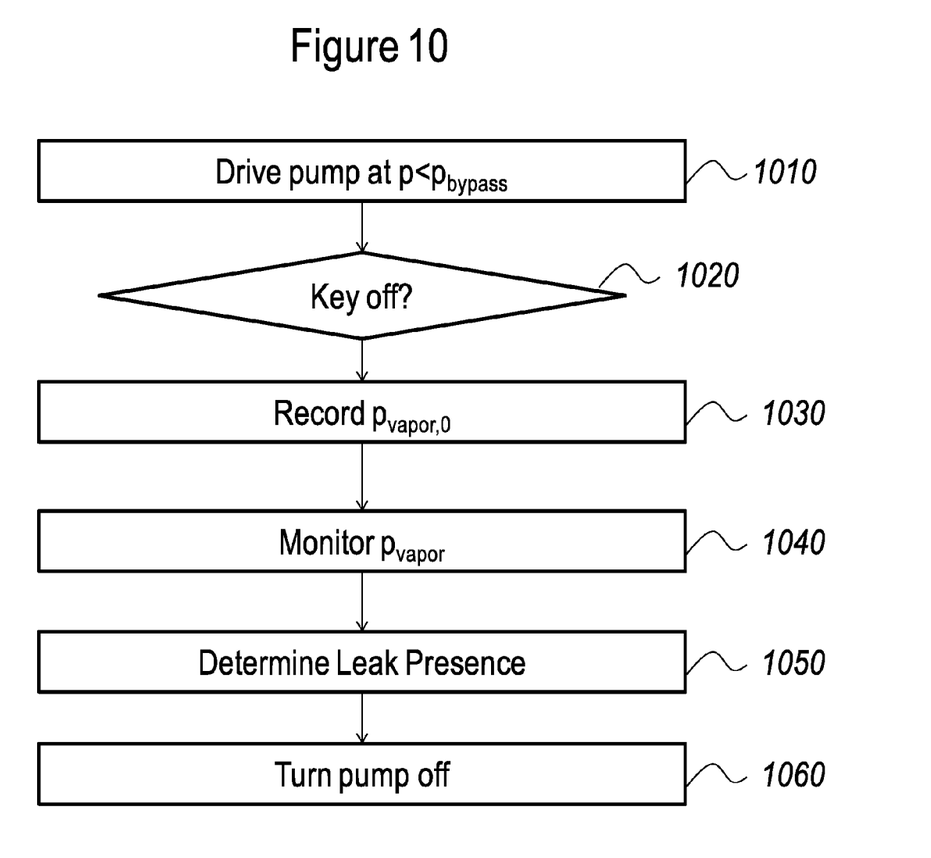

FIG. 10 depicts another embodiment of the method according to the present invention. In this embodiment the vehicle has been running during a drive cycle 1010. When the vehicle is shut off 1020, an initial pressure $P_{vapor,0}$ is taken 1030, and the pump continues to run for a specified time and or to a predetermined pressure level. At one or several points during the operation of the pump after the vehicle is shut off, the pressure in the tank is monitored 1040 and compared to calibrated no-leak values to determine whether or not there is a leak in the system 1050. After the test the pump is turned off 1060.

Although the invention has been described hereinabove with reference to specific embodiments, this has been done to illustrate and not to limit the invention, the scope of which is to be determined by means of the attached claims.

Although certain features have been described only in relation to embodiments of the system according to the present invention, this has been done for clarity reasons only, and the skilled person will appreciate that these features can be applied embodiments of the method according to the present invention with the same technical effects and advantages, and vice versa.

The invention claimed is:

1. A vehicular fuel containment system comprising:
   a tank;
   a pump arranged to pump a fuel from the tank to a fuel injection system of an internal combustion engine via a feed line;
   a pressure sensor arranged to detect a pressure in a vapor dome inside the tank; and
   a sprayer arranged within a branch of the feed line, an outlet of the sprayer being arranged inside the tank.

2. The vehicular fuel containment system according to claim 1, further comprising a valve operatively arranged between the pump and the sprayer.

3. The vehicular fuel containment system according to claim 2, wherein the valve is a normally-closed valve, adapted to be opened by occurrence of a predetermined minimum pressure at an inlet side.

4. The vehicular fuel containment system according to claim 2, wherein the valve is a normally-closed valve, adapted to be opened by external actuation.

5. The vehicular fuel containment system according to claim 2, wherein the valve and the pressure sensor are operatively controlled by an electronic control unit, directly or indirectly.

6. The vehicular fuel containment system according to claim 5, wherein the electronic control unit is configured to relay a leak detection signal to an On-Board Diagnostics system.

7. The vehicular fuel containment system according to claim 1, wherein the sprayer is arranged above a maximum fill level of the tank.

8. A vehicle comprising the vehicular fuel containment system according to claim 1.

9. A method to verify integrity of a vehicular liquid containment system, the system comprising a tank, a pump, a pressure sensor, and a sprayer, the pump arranged to pump a fuel from the tank to a vehicular system via a feed line, the pressure sensor arranged to detect a pressure in a vapor dome inside the tank, the sprayer arranged within a branch of the feed line, an outlet of the sprayer being arranged inside the tank, the method comprising:

operating the pump to activate the sprayer;
monitoring pressure sensed by the pressure sensor subsequent to the activation of the sprayer; and
determining whether the monitored pressure deviates from a predetermined pressure evolution based on one or more measurements.

10. A non-transitory computer readable medium including a computer program comprising a code configured to cause a processor to carry out the method of claim 9.

* * * * *